J. R. DEMPSY.
Riding-Saddle.
No. 200,378.  Patented Feb. 19, 1878.
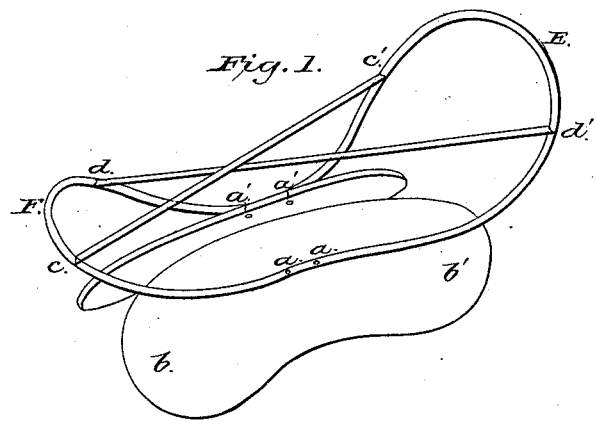
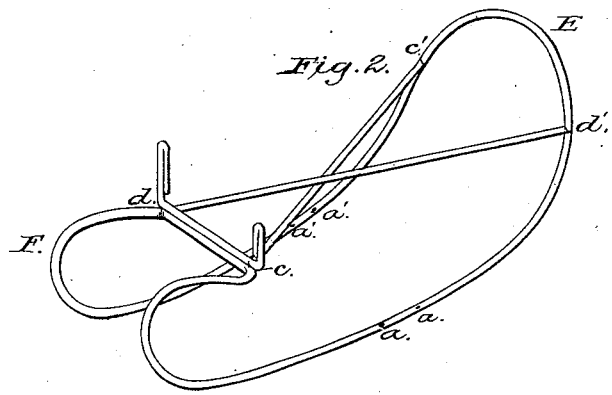
Attest:  
Jno W Caldwell  
Wilbur F. Prynder
Inventor:  
James R Dempsy

UNITED STATES PATENT OFFICE.

JAMES R. DEMPSY, OF LOGAN COUNTY, KENTUCKY.

IMPROVEMENT IN RIDING-SADDLES.

Specification forming part of Letters Patent No. 200,378, dated February 19, 1878; application filed May 27, 1876.

*To all whom it may concern:*

Be it known that I, JAMES R. DEMPSY, of the county of Logan, in the State of Kentucky, have invented a new and Improved Ventilated Spring-Seat for Saddles; and I do hereby declare that the following is a full, clear, and exact description of the same, reference being had to the accompanying drawing, forming a part of this specification, in which—

Figure 1 is a view of a spring for a man's saddle, and Fig. 2 is a view of a spring for a woman's saddle.

The invention relates to the improvements in riding-saddles for men and women, so that the riding shall be more pleasant by reason of a swing and spring movement provided for, and so that the rider's seat shall not be directly on the saddle-bed, but so far above it as to permit the circulation of air between the seat and the horse's back. This spring may be used on a common saddle-tree, by having it fastened by bolts to the tree at points $a$ $a'$, or it may be fastened to side pads $b$ $b'$, in lieu of a saddle-tree, by the bolts $a$ $a'$.

F is the front end. E is the rear end of the spring, which is so shaped as to conform measurably to the outlines of a common saddle-seat. The seat is formed by bands $c$ $c'$ $d$ $d'$, &c., over which bands any kind of saddle-seat may be made. When the spring is bolted to the tree at $a$ $a'$, on each side, the sides of the spring at the points $a$ $a'$ across the seat will be about six inches apart, more or less, according as the saddle is large or small. From these points the spring rounds out upward to the front F, and out and upward to the rear E, as shown, both ends, F and E, being curved upward in the shape of a common saddle-top.

First, the weight of the rider pressing on the bands or single piece, draws the ends E and F toward him, and at every partial lifting of the weight these ends spring back, so that the saddle-seat follows the rider when raised up by a rough-moving horse; second, the bands form a swing, moving slightly forward and backward, thus enabling the rider, by changing his place, to alter the angle of his seat, as a rest; third, being hung from the ends E and F like a hammock, it leaves an air-passage underneath, by which both the seat and the horse's back may be kept cool.

What I claim as new, and what I wish to have protected by Letters Patent, is—

The ventilated spring-seat for saddles, consisting of the spring-frame, with the ends E F curved upward and connected together by cross-bands $c$ $c'$ and $d$ $d'$, the whole adapted for spring movement in any direction, all substantially as shown and described.

JAMES R. DEMPSY.

Witnesses:
   JNO. W. CALDWELL,
   WILBUR F. BROWDER.